(12) United States Patent
Yoon

(10) Patent No.: US 7,698,337 B2
(45) Date of Patent: Apr. 13, 2010

(54) METHOD FOR OFFERING NEWS ARTICLE VIA ON-LINE SYSTEM BASED UPON EDITORIAL INDEX AND SYSTEM FOR EXECUTING THE METHOD

(75) Inventor: Taesock Yoon, Gyeonggi-do (KR)

(73) Assignee: NHN Corporation, Kyunggi-do (KR)

( * ) Notice: Subject to any disclaimer, the term of this patent is extended or adjusted under 35 U.S.C. 154(b) by 381 days.

(21) Appl. No.: 11/696,322

(22) Filed: Apr. 4, 2007

(65) Prior Publication Data
US 2007/0240911 A1 Oct. 18, 2007

(30) Foreign Application Priority Data
Apr. 18, 2006 (KR) .................. 10-2006-0034838

(51) Int. Cl.
*G06F 17/30* (2006.01)
(52) U.S. Cl. ................................. 707/752; 707/748
(58) Field of Classification Search .............. 704/8; 707/709, 715
See application file for complete search history.

(56) References Cited

U.S. PATENT DOCUMENTS

| 5,875,446 | A  | * | 2/1999  | Brown et al. ......... 707/3 |
| 5,905,981 | A  |   | 5/1999  | Lawler |
| 5,953,718 | A  | * | 9/1999  | Wical ................ 707/5 |
| 6,185,550 | B1 | * | 2/2001  | Snow et al. .......... 707/1 |
| 6,421,675 | B1 | * | 7/2002  | Ryan et al. ......... 707/100 |
| 6,757,646 | B2 | * | 6/2004  | Marchisio ........... 704/8 |
| 6,772,139 | B1 | * | 8/2004  | Smith, III .......... 707/3 |
| 7,058,516 | B2 | * | 6/2006  | Mascarenhas ........ 702/19 |
| 7,269,598 | B2 | * | 9/2007  | Marchisio .......... 707/709 |
| 7,370,381 | B2 | * | 5/2008  | Tuttle et al. ........ 707/3 |
| 7,433,893 | B2 | * | 10/2008 | Lowry .............. 707/715 |
| 2003/0217328 | A1 |  | 11/2003 | Agassi et al. |
| 2004/0003097 | A1 |  | 1/2004  | Willis et al. |

FOREIGN PATENT DOCUMENTS

| JP | 2007287154 A | * | 11/2007 |
| KR | 10-2001-0108877 A | | 12/2001 |
| KR | 10-2002-0005108 A | | 1/2002 |
| KR | 10-2002-0036650 A | | 5/2002 |
| KR | 1020020036114 A | | 5/2002 |
| KR | 10-2005-0087226 A | | 8/2005 |

OTHER PUBLICATIONS

Alguliev, R.M. Aliguliyev, R.M.; Effective summarization method of text documents; Sep. 19-22, 2005; Web Intelligence, 2005. Proceedings. The 2005 IEEE/WIC/ACM International Conference; pp. 264-271; retrieved from IEEE digital library.*

* cited by examiner

*Primary Examiner*—Shahid A Alam
(74) *Attorney, Agent, or Firm*—Husch Blackwell Sanders LLP

(57) ABSTRACT

A method of assigning a weight value to an online news article, and a system for executing the method are provided. A method of assigning a weight value to an online news article, includes the steps of: receiving an article content from an article providing system of an article generator, and storing the received article content in an article collection database; creating an editorial weight value of the article content via an automatic weight assigning system, the automatic weight assigning system comprising a plurality of weight value lists; and storing the editorial weight value and the article content in a news database.

19 Claims, 12 Drawing Sheets

FIG. 12

| PAGE | WEIGHT VALUE | PAGE | WEIGHT VALUE |
|---|---|---|---|
| PAGE 1 | 100 | PAGE 21 | 50 |
| PAGE 2 | 97.5 | PAGE 22 | 47.5 |
| PAGE 3 | 95 | PAGE 23 | 45 |
| PAGE 4 | 92.5 | PAGE 24 | 42.5 |
| PAGE 5 | 90 | PAGE 25 | 40 |
| PAGE 6 | 87.5 | PAGE 26 | 37.5 |
| PAGE 7 | 85 | PAGE 27 | 35 |
| PAGE 8 | 82.5 | PAGE 28 | 32.5 |
| PAGE 9 | 80 | PAGE 29 | 30 |
| PAGE 10 | 77.5 | PAGE 30 | 27.5 |
| PAGE 11 | 75 | PAGE 31 | 25 |
| PAGE 12 | 72.5 | PAGE 32 | 22.5 |
| PAGE 13 | 70 | PAGE 33 | 20 |
| PAGE 14 | 67.5 | PAGE 34 | 17.5 |
| PAGE 15 | 65 | PAGE 35 | 15 |
| PAGE 16 | 62.5 | PAGE 36 | 12.5 |
| PAGE 17 | 60 | PAGE 37 | 10 |
| PAGE 18 | 57.5 | PAGE 38 | 7.5 |
| PAGE 19 | 55 | PAGE 39 | 5 |
| PAGE 20 | 52.5 | PAGE 40 | 2.5 |
|  |  | AFTER PAGE 41 | 2 |

FIG. 13

| SECTION RANKING | WEIGHT VALUE |
|---|---|
| 1 | 1 |
| 2 | 0.95 |
| 3 | 0.9 |
| 4 | 0.85 |
| 5 | 0.8 |
| 6 | 0.75 |
| 7 | 0.7 |
| 8 | 0.65 |
| 9 | 0.6 |
| 10 | 0.55 |
| AFTER 11 | 0.5 |

METHOD FOR OFFERING NEWS ARTICLE VIA ON-LINE SYSTEM BASED UPON EDITORIAL INDEX AND SYSTEM FOR EXECUTING THE METHOD

CROSS-REFERENCE TO RELATED APPLICATION

This application claims the benefit of Korean Patent Application No. 10-2006-0034838, filed on Apr. 18, 2006, in the Korean Intellectual Property Office, the disclosure of which is incorporated herein by reference.

BACKGROUND OF THE INVENTION

1. Field of the Invention

The present invention relates to a method of assigning a weight to an online news article, and a system for executing the method, and more particularly, to a method and system which can assign an editorial weight value based upon the editorial index to a news article of an article generator, and thereby inform users of a value of an article, determined to be important by the article generator, in an online system.

2. Description of Related Art

Current print-type newspaper edits an article, which a corresponding newspaper company determines to be important, and determines a display location of the article for each page. Accordingly, newspaper readers read articles which have been edited according to an inclination of the newspaper company. Generally, the newspaper company places important articles on a front page to emphasize a message for readers.

However, the index of the rated article may not be applied to an online news article, particularly, to news portals. Specifically, since an article is transmitted from the newspaper company irrespective of importance of the article, it may not be easy to inform online users about the importance of the article in an online system.

FIG. 1 illustrates a system for collecting and providing an article according to a conventional art. As shown in FIG. 1, the system includes a database 102, a search engine 103, and a webpage 104. The database 102 collects an article content 101 from each of a plurality of article generators. The search engine 103 searches the database 102 for the article content 101 by using a keyword entered from a user. The webpage 104 displays the retrieved article content 101 to the user.

As described above, in the conventional art, an importance for the article content 101, determined by the article generators concerning the article content 101, is not reflected. Specifically, the article content 101 is retrieved according to the entered keyword, and the retrieved article content 101 is displayed for the user.

Specifically, in a conventional article providing system, an article generator may not transmit a message of the article generator to a user. Also, the user may not recognize an importance for each article.

BRIEF SUMMARY

The present invention provides a method of assigning a weight value in an online news article, and a system for executing the method.

It is an aspect of the present invention to assign an editorial weight value based upon an editorial index of the source to an article content according to a weight value for the page reference and a weight value for the section reference, and provide a user of the article content with the article content and the editorial weight value based upon the editorial index, so that the user may recognize an importance of the article content, determined by an article generator of the article content, from the editorial weight value based upon the editorial index.

It is another aspect of the present invention to enable a user to retrieve an article content according to an importance of the article content in which the article content is sorted according to an editorial weight value based upon the editorial index.

It is still another aspect of the present invention to improve the quality of an article content by providing a user with a rating field for the article content, making a community space between an article generator and the user based on rating information entered into the rating field, and feeding back the rating information to the article generator.

According to an aspect of the present invention, there is provided a method of assigning an editorial weight value to an online news article, the method including the steps of: receiving an article content from an article providing system of an article generator, and storing the received article content in an article collection database; creating an editorial weight value based upon the editorial index of the article content via an automatic weight assigning system, the automatic weight assigning system comprising a plurality of weight value lists; and storing the editorial weight value based upon the editorial index and the article content in a news database.

In an aspect of the present invention, the plurality of weight value lists comprise a weight value list for the page reference and a second weight value list for the section reference, and the step of creating may include the steps of: selecting a first weight value for the page reference associated with the article content by referring to the first weight value list for the page reference; selecting a second weight value for the section reference associated with the article content by referring to the second weight value list for the section reference; and creating the editorial weight value based on the first weight value for the page reference and the second weight value for the section reference.

In an aspect of the present invention, the first weight value list for the page reference comprises a list in which the weight value for the page reference is applied to each page of a medium including a newspaper, and the step of selecting the first weight value for the page reference may include the steps of: extracting page information of a page in which the article content is included, from the article content stored in the article collection database; and selecting the first weight value for the page reference, corresponding to the page information, from the first weight value list for the page reference.

In an aspect of the present invention, the second weight value list for the section reference comprises a list in which the second weight value for the section reference is applied to the article content in an order of a number of characters, the article content being included in the same page of a medium including a newspaper, and the step of selecting the second weight value for the section reference may include the steps of: identifying the number of characters included in the article content; and selecting the second weight value for the section reference, corresponding to the number of characters, from the second weight value list for the section reference.

According to another aspect of the present invention, there is provided a system for assigning a weight value to an online news article, the system including: an article collection database configured to store an article content received from an article providing system of an article generator; an automatic weight assigning system configured to comprise a plurality of weight value lists and create an editorial weight value of the article content by referring to the plurality of weight value lists; and a news database configured to store the editorial weight value based upon the editorial index and the article content.

BRIEF DESCRIPTION OF THE DRAWINGS

The above and/or other aspects and advantages of the present invention will become apparent and more readily appreciated from the following detailed description, taken in conjunction with the accompanying drawings of which:

FIG. 12 illustrates an example of a weight value list for the page reference according to an exemplary embodiment of the present invention; and FIG. 13 illustrates an example of a weight value list for the section reference according to an exemplary embodiment of the present invention.

DETAILED DESCRIPTION OF EMBODIMENTS

Figure 1:
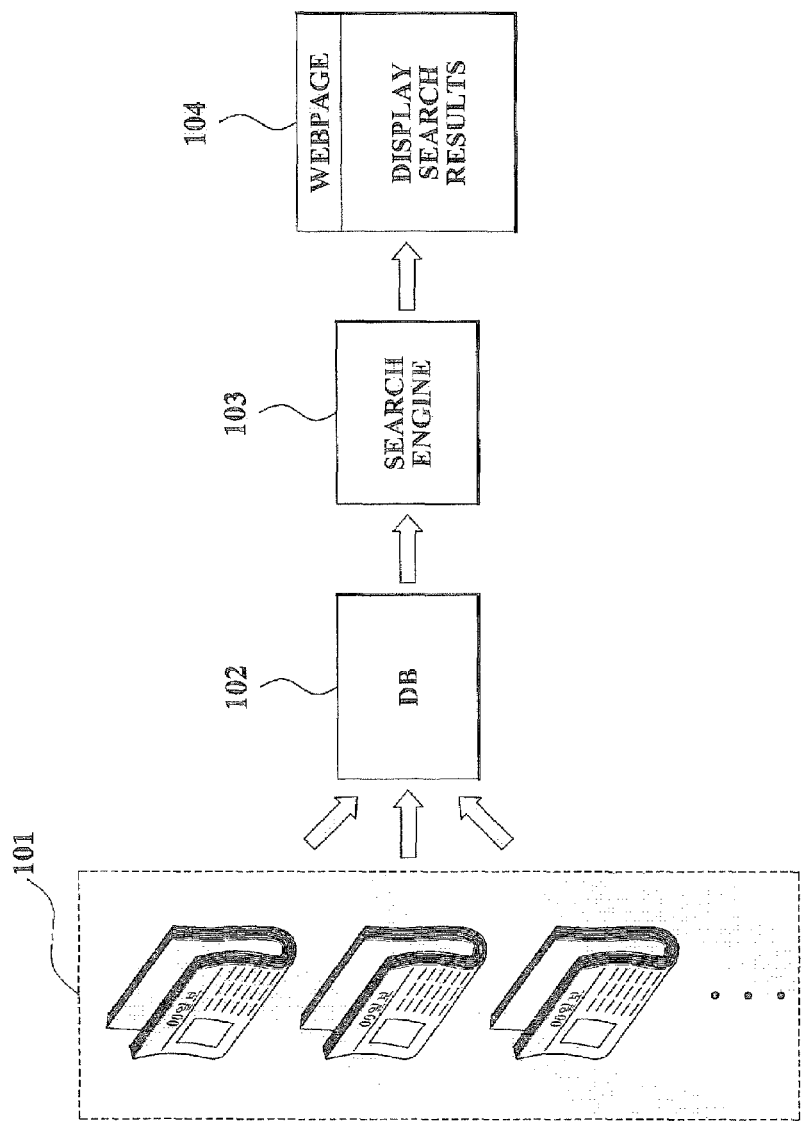
FIG. 1 illustrates a system for collecting and providing an article according to a conventional art.

Reference will now be made in detail to exemplary embodiments of the present invention, examples of which are illustrated in the accompanying drawings, wherein like reference numerals refer to the like elements throughout. The exemplary embodiments are described below in order to explain the present invention by referring to the figures.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a module. One or more components can reside within a process and/or thread of execution, and a module or component can be localized on one computer and/or distributed between two or more computers.

As used herein, the terms "desktop," "PC," "local computer," and the like, refer to computers on which systems (and methods) according to the invention operate. In the illustrated embodiments, these are personal computers, such as portable computers and desktop computers; however, in other embodiments, they may be other types of computing devices (e.g., workstations, mainframes, personal digital assistants or PDAs, music or MP3 players, and the like).

Figure 2:
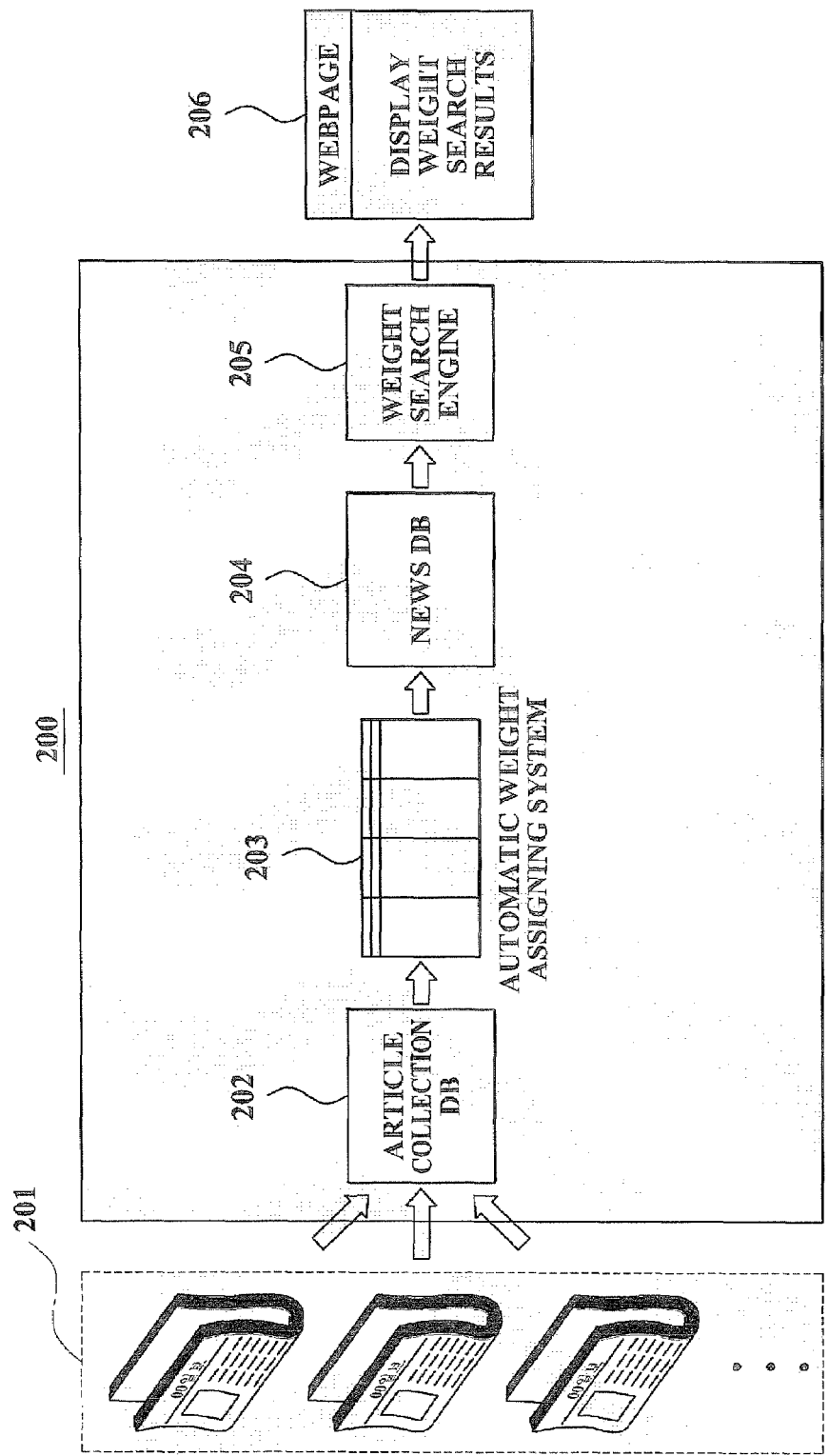
FIG. 2 illustrates a weight assigning system for assigning a weight value to an online news article according to an exemplary embodiment of the present invention.

FIG. 2 illustrates a weight assigning system 200 for assigning weight values to online news articles according to an exemplary embodiment of the present invention. The weight assigning system 200 may include an article collection database 202, an automatic weight assigning system 203, a news database 204, and a weight search engine 205.

The article collection database 202 collects an article content 201 from each of a plurality of article generators, such as news paper companies. The automatic weight assigning system 203 assigns an editorial weight value based upon the editorial index to the article content 201. The news database 204 stores the assigned editorial weight value based upon the editorial index and the article content 201.

When a keyword is entered from a user of the article content 201, the article content 201 and the editorial weight value based upon the editorial index are provided for the user via the weight search engine 205. Accordingly, an importance of the article content 201, determined by the article generator, may be informed to the user.

A method of assigning a weight value will be described in detail with reference to FIGS. 3 through 8. Also, the weight assigning system 200 will be further described in detail with reference to FIG. 9.

Figure 3:
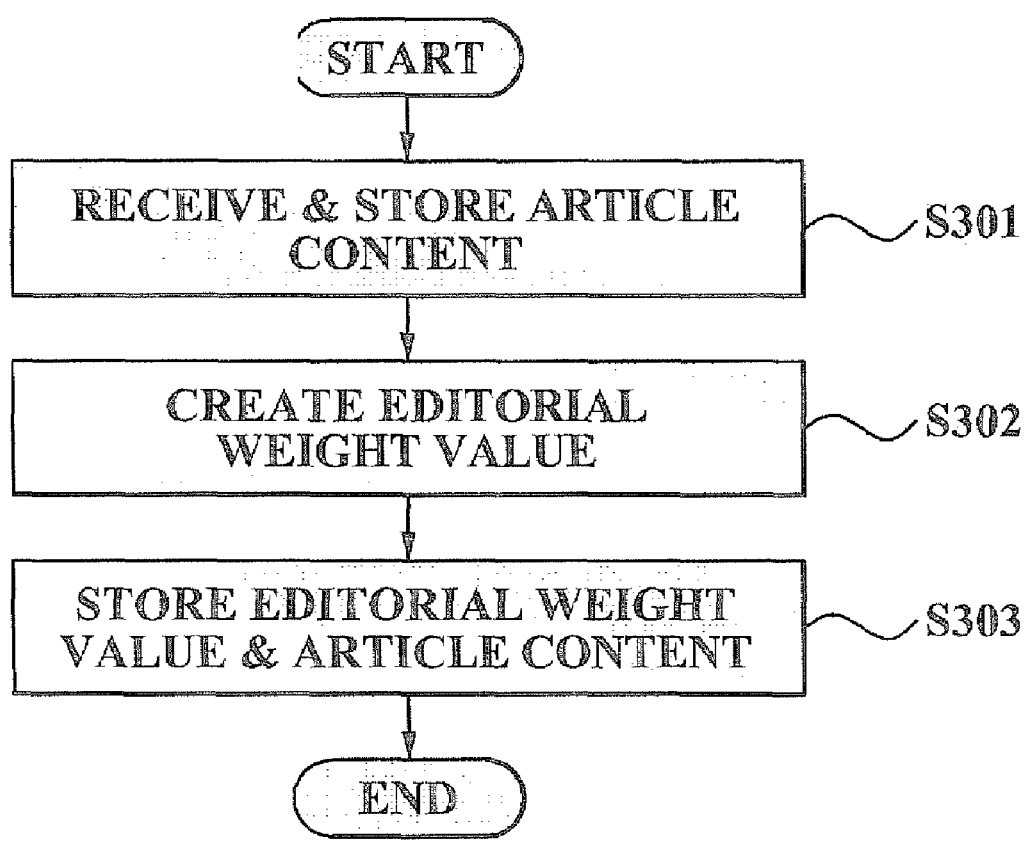
FIG. 3 is a flowchart illustrating a method of assigning a weight value to an online news article according to an exemplary embodiment of the present invention.

FIG. 3 is a flowchart illustrating a method of assigning a weight value to an online news article according to an exemplary embodiment of the present invention.

In operation S301, a weight assigning system for assigning the weight value to the online news article receives an article content from an article providing system of an article generator, and stores the received article content in an article collection database. In this case, operation S301 may include operations S701 and S702. Operation S701 and S702 will be described later with reference to FIG. 7.

In operation S302, the weight assigning system creates an editorial weight value based upon the editorial index of the article content via an automatic weight assigning system including a plurality of weight value lists. Operation S302 will be further described in detail with reference to FIG. 4.

In operation S303, the weight assigning system stores the editorial weight value based upon the editorial index and the article content in a news database. In this instance, operation S303 may further include an operation of creating a predetermined weight value for a predetermined media category when a category of the article content is included in the media category. Also, the media category may include a category associated with any one of an editorial, an essay, an article including the article generator's subjective editing, a personnel, an obituary, a state of affairs, a current housing price, and a stock price.

Figure 8:
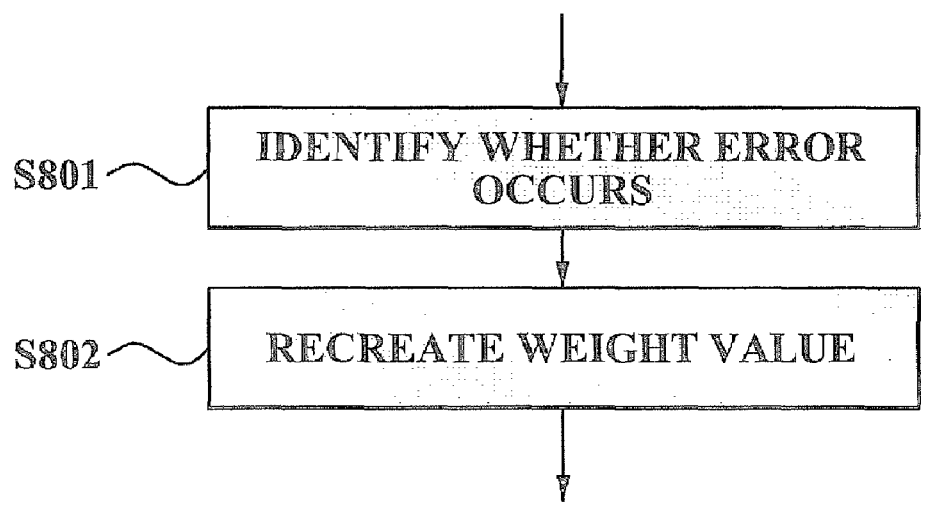
FIG. 8 is a flowchart illustrating a method of correcting a weight value error according to an exemplary embodiment of the present invention.

A method of utilizing the stored article content and the editorial weight value based upon the editorial index will be further described in detail with reference to FIG. 5. Also, operation S303 may additionally include operations S601 through S603 of FIG. 6, and operations S801 and S802 of FIG. 8. FIGS. 6 and 8 will be described in detail later.

Figure 4:
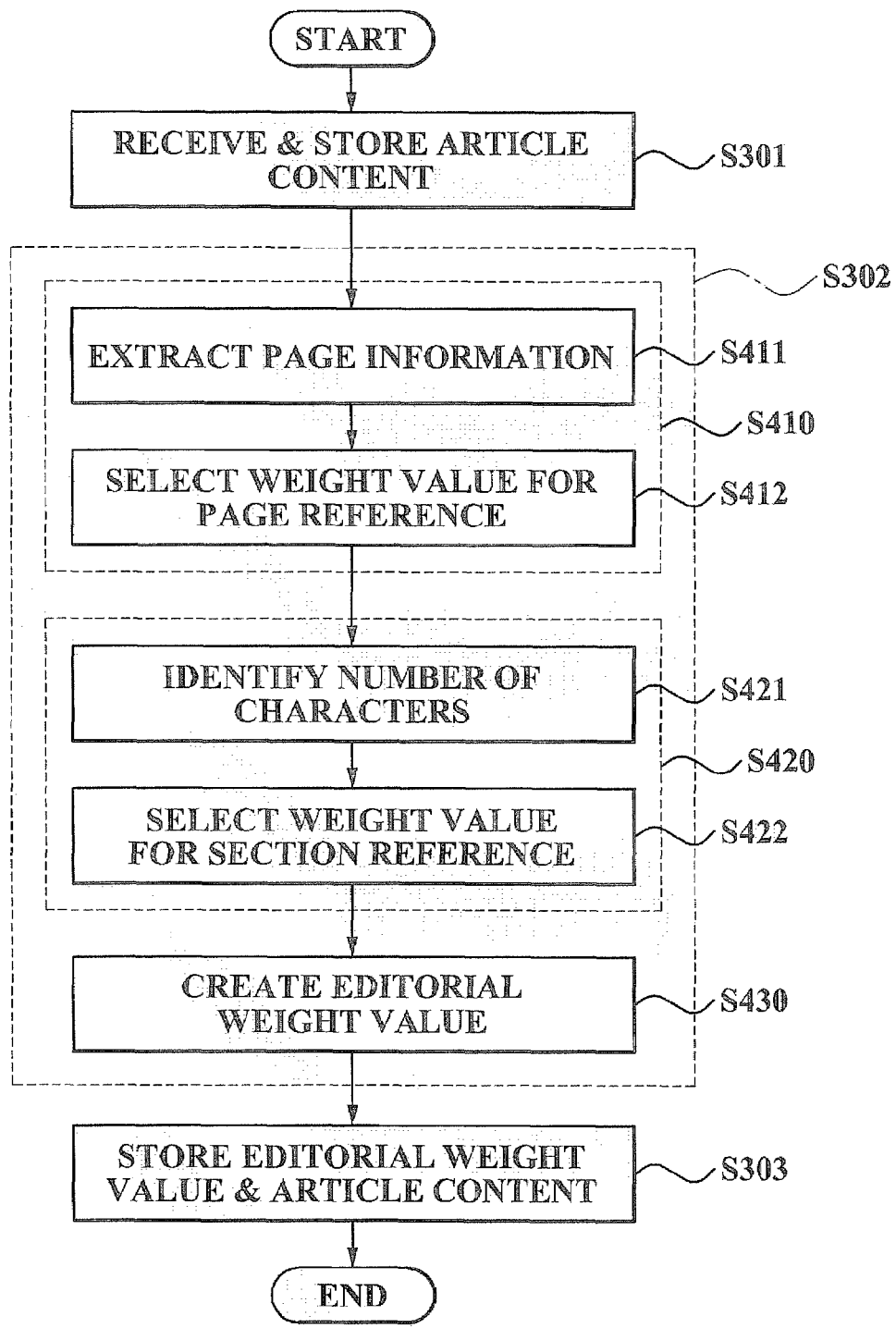
FIG. 4 is a flowchart illustrating a method of creating an editorial weight value based upon the editorial index according to an exemplary embodiment of the present invention.

FIG. 4 is a flowchart illustrating a method of creating an editorial weight value based upon the editorial index according to an exemplary embodiment of the present invention. As shown in FIG. 4, operation S302 may include operations S410 through S430.

In operation S410, the weight assigning system selects a weight value for the page reference associated with the article content by referring to a weight value list for the page reference among the plurality of weight value lists including the weight value list for the page reference and a weight value list for the section reference.

In this instance, the weight value list for the page reference may include a list in which the weight value for the page reference is assigned to each page of a medium including a newspaper. Specifically, if utilizing the weight value list for the page reference, it is possible to express the article generator's editing intention into the article content by assigning a different weight value for the page reference to a display page of each article in which the article generator reflects the article generator's editing intention into the medium, such as a newspaper.

Operation S410 may include operations S411 and 412.

In operation S411, the weight assigning system extracts page information of a page, in which the article content is included, from the article content stored in the article collection database.

To extract the page information from the article content, for example, a method of receiving an article content in an eXtensible Markup Language (XML) format, including a news Markup Language (newsML), from an article providing system of an article generator providing the article content is utilized.

The page information may not be extracted from an article content in a text-based format, such as a News Industry Text Format (NITF), a HyperText Markup Language (HTML) format, and the like. In this case, to acquire the page information, operation S301 of FIG. 3 may include operations of identifying whether the page information is included in the article content, and extracting the page information from a predetermined information data field for each newspaper page, and storing the extracted page information in the article collection database when the page information is excluded from the article content. Also, the information data field for each newspaper page may include page information corresponding to a keyword table, and provide the page information via a category and a keyword of the article content.

In operation S412, the weight assigning system selects the weight value for the page reference, corresponding to the page information, from the weight value list for the page reference.

In operation S420, the weight assigning system selects a weight value for the section reference associated with the article content by referring to the weight value list for the section reference. In this instance, the weight value list for the section reference may include a list in which the weight value for the section reference is applied to the article content in an order of a number of characters. The article content is included in the same page of a medium including a newspaper. For the above operation, operation S420 may include operations S421 and S422.

In operation S421, the weight assigning system identifies the number of characters included in the article content.

In operation S422, the weight assigning system selects the weight value for the section reference, corresponding to the number of characters, from the weight value list for the section reference. The section reference can indicate a section, column, or position of the news article in a specific page of the newspaper.

In operation S430, the weight assigning system creates the editorial weight value based upon the editorial index based on the weight value for the page reference and the weight value for the section reference. In this case, operation S430 may correspond to an operation of creating the editorial weight value based upon the editorial index by multiplying the weight value for the page reference and the weight value for the section reference.

Figure 5:
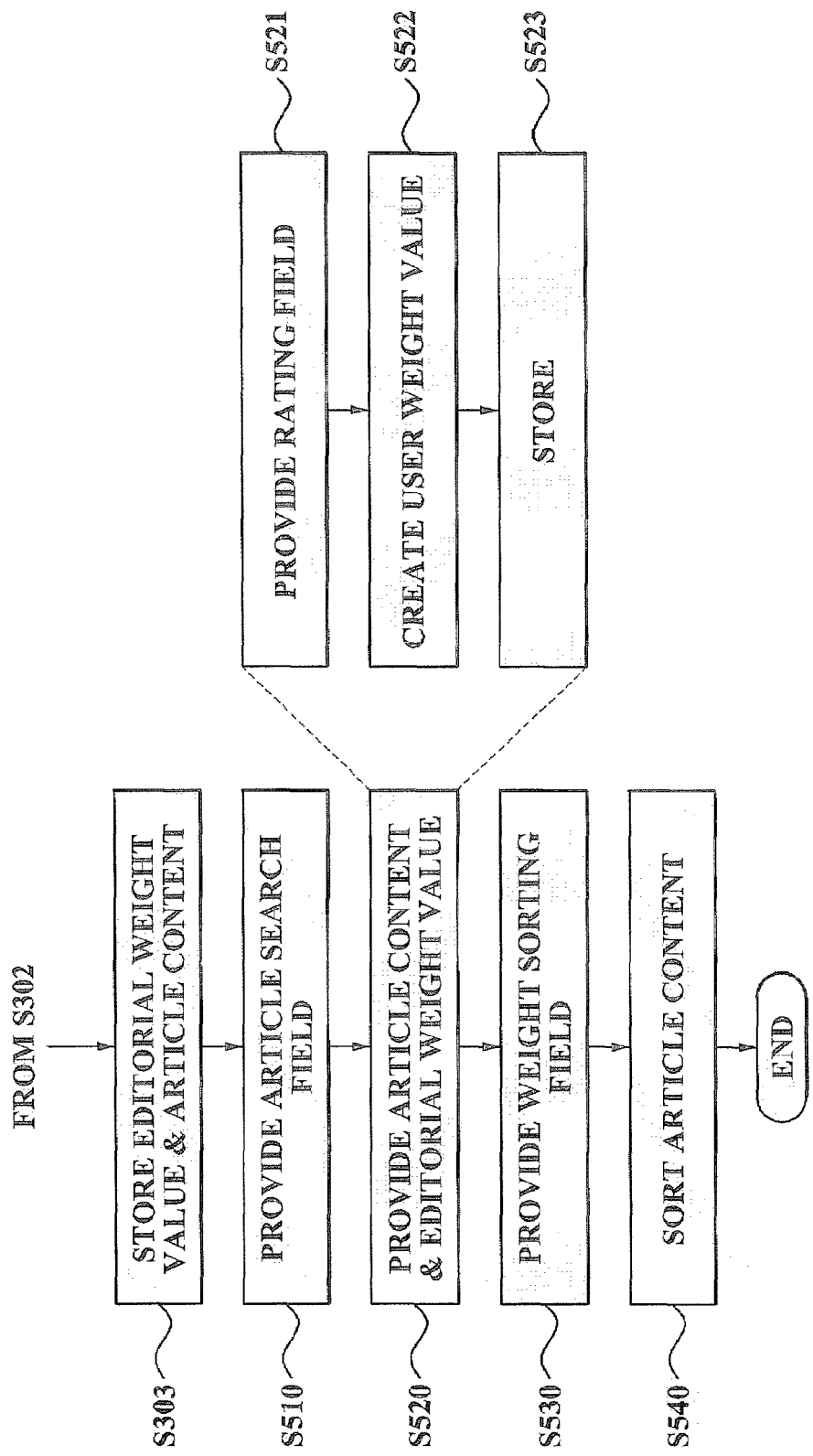
FIG. 5 is a flowchart illustrating a method of utilizing an editorial weight value based upon the editorial index according to an exemplary embodiment of the present invention.
Figure 6:
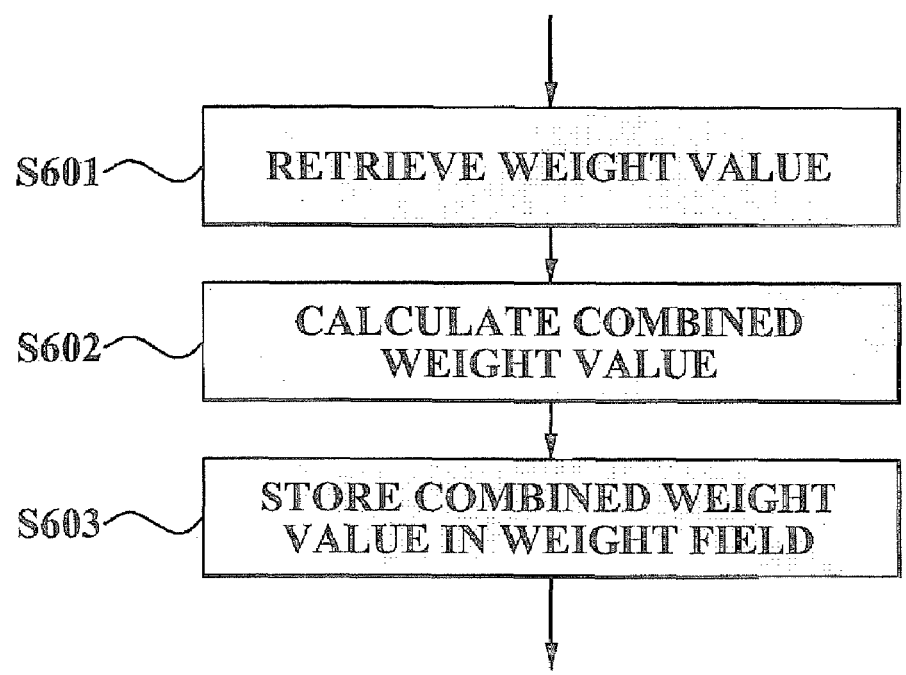
FIG. 6 is a flowchart illustrating a method of calculating a combined weight value according to an exemplary embodiment of the present invention.

FIG. 5 is a flowchart illustrating a method of utilizing an editorial weight value based upon the editorial index according to an exemplary embodiment of the present invention. As shown in FIG. 5, operations S510 through S540 may be additionally performed after operation S303.

In operation S510, the weight assigning system provides an article search field to receive a keyword from a user of the article content to retrieve the article content.

In operation S520, the weight assigning system provides the article content and the editorial weight value based upon the editorial index via a weight search engine when the keyword is received. In this instance, operation S520 may include operations S521 through 523.

As described above, according to the present invention, it is possible to assign an editorial weight value based upon the editorial index to an article content according to a weight value for the page reference and a weight value for the section reference, and provide a user of the article content with the article content and the editorial weight value based upon the editorial index, so that the user may recognize an importance of the article content, determined by an article generator of the article content, from the editorial weight value based upon the editorial index.

In operation S521, the weight assigning system provides the user with a rating field for rating the article content.

In operation S522, the weight assigning system creates a user weight value based on rating information entered into the rating field.

In operation S523, the weight assigning system stores the user weight value in the news database.

Through operations S521 through S523, the rating field for rating the article content is displayed to the user so that the user may enter the rating information into the rating field. Accordingly, it is possible to make a community space between the article generator and the user by using the rating information entered into the rating field. Also, it is possible to improve the quality of the article content by feeding back the rating information to the article generator.

In operation S530, the weight assigning system provides the user with a weight sorting field for sorting the article content according to the editorial weight value based upon the editorial index.

In operation S540, the weight assigning system sorts the article content according to the editorial weight value based upon the editorial index when the weight sorting field is selected.

As described above, the weight assigning system according to the present exemplary embodiment may sort the article content according to the editorial weight value based upon the editorial index and thereby enable the user to retrieve the article content according to the editorial weight value based upon the editorial index through operations S530 and S540.

FIG. 6 is a flowchart illustrating a method of calculating a combined weight value according to an exemplary embodiment of the present invention.

In operation S601, the weight assigning system searches the news database for a weight value associated with the article content. In this instance, the news database may include a plurality of weight fields with respect to the article content.

In operation S602, the weight assigning system calculates a combined weight value based on an operation with respect to the plurality of weight values when the plurality of weight values is retrieved. In this instance, the combined weight value may be utilized as a reference to sort the article content in an order of the combined weight value, and the operation includes at least one of an add operation and a multiply operation for each weight value.

Figure 7:
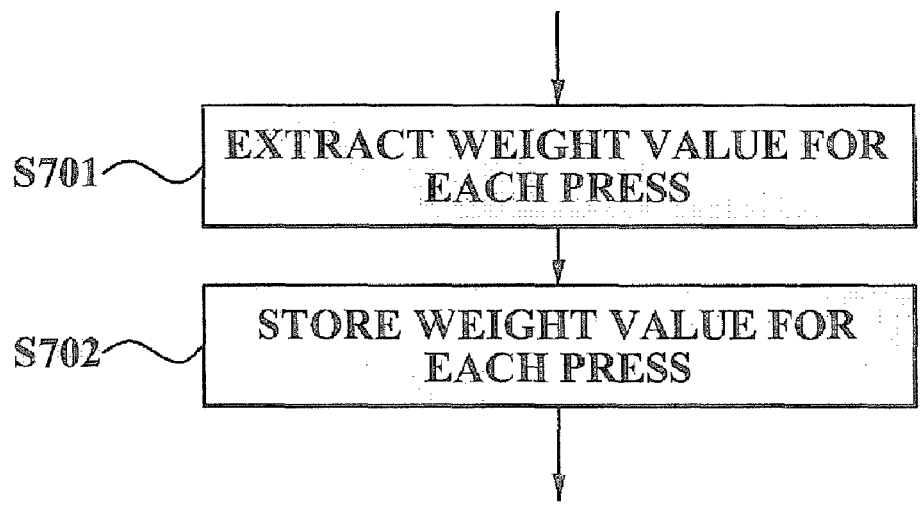
FIG. 7 is a flowchart illustrating a method of extracting and storing a weight value for each media sector according to an exemplary embodiment of the present invention.

In operation S603, the weight assigning system stores the combined weight value in the weight field to store a weight value of the article content in the news database. FIG. 7 is a flowchart illustrating a method of extracting and storing a weight value for each media sector according to an exemplary embodiment of the present invention. Operations S701 and S702 of FIG. 7 may be additionally performed after operation S301.

In operation S701, the weight assigning system extracts a weight value for each media sector of a media sector associated with the article content, from a weight value list for each media sector. In this instance, the weight value list for each media sector may include a list in which the weight value for each media sector is determined according to a total of pages of a medium for each media sector.

In operation S702, the weight assigning system stores the weight value for each media sector in the article collection database in association with the article content. In this instance, the weight value for each media sector may be stored in the news database with the article content when the article content is stored in the news database.

FIG. 8 is a flowchart illustrating a method of correcting a weight error according to an exemplary embodiment of the present invention. Operations S801 and S802 of FIG. 8 may be additionally performed after operation S303.

In operation S801, the weight assigning system identifies whether an error occurs in the weight value stored in the news database. In this instance, an error occurrence may be identified by checking whether any one of the information data field for each newspaper page, the weight field for each page, the weight value list for the section reference, and the weight value list for each media sector is corrected.

In operation S802, the weight assigning system recreates the weight value with respect to a weight error when the weight error occurs. For example, when the weight value list for the page reference is corrected, the weight assigning system may correct the weight error by reselecting the weight value for the page reference from the page list of the article content, and creating the editorial weight value based upon the editorial index by multiplying the weight value for the page reference and the weight value for the section reference.

Figure 9:
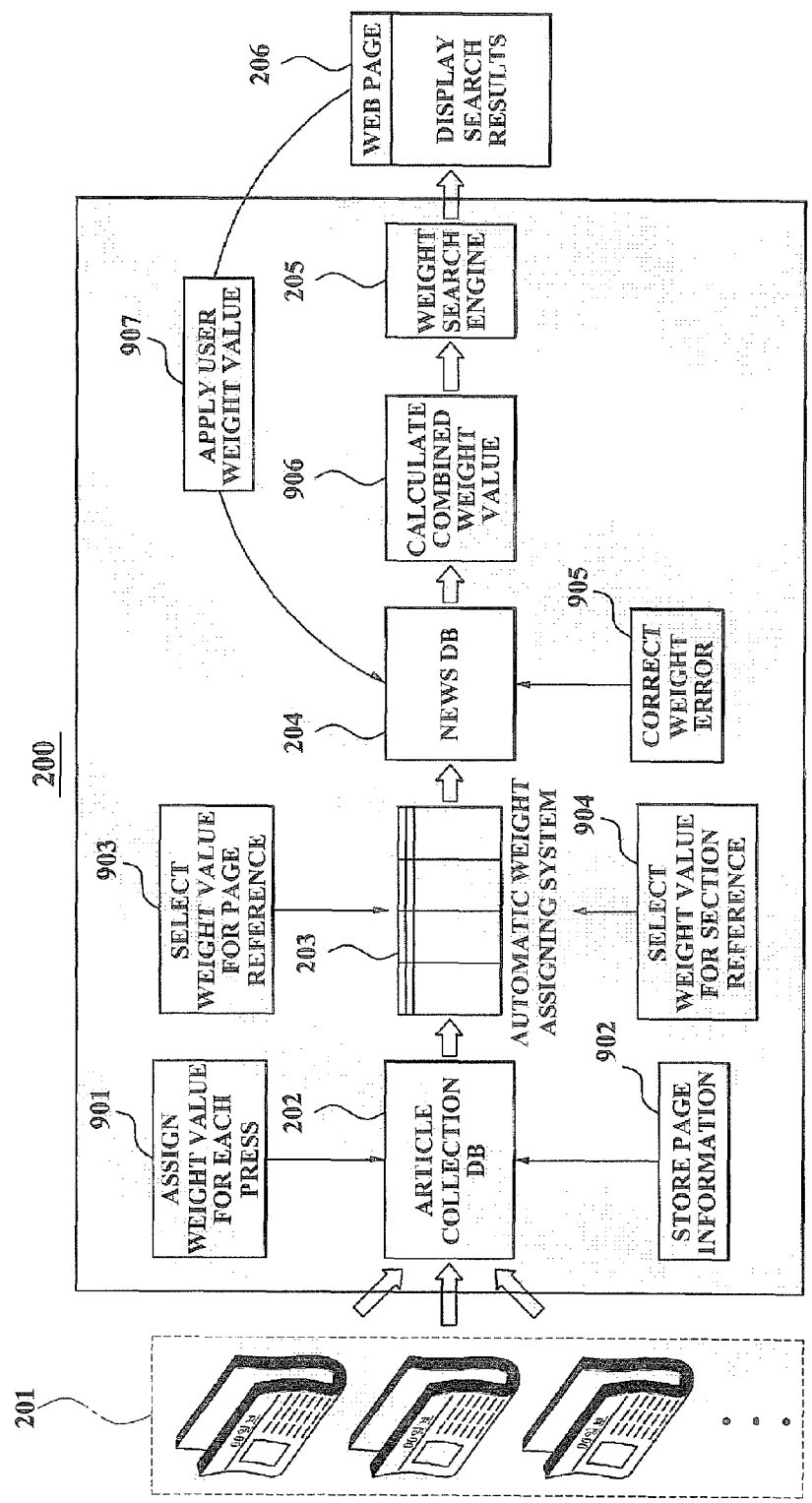
FIG. 9 illustrates an example of a weight assigning system assigning a weight value to an article content and utilizing the weight value according to an exemplary embodiment of the present invention.

FIG. 9 illustrates an example of a weight assigning system 200 assigning a weight value to an article content and utilizing the weight value according to an exemplary embodiment of the present invention.

The weight assigning system 200 stores an article content 201 in the article collection database 202. In this instance, the article content 201 is received from an article providing system of each of article generators, for example, media. In this instance, the weight assigning system 200 extracts a weight value for each media sector of the article content 201 by referring to a weight value list for each media sector, and stores the extracted weight value for each media sector and the article content 201 in the article collection database 202 in operation 901. In this instance, the weight value for each media sector is stored together with the article content 201 when the article content 201 is stored in the news database 204.

The weight assigning system 200 identifies whether page information of a page including the article content 201 is included in the article content 201. When the page information is excluded from the article content 201, the weight assigning system 200 extracts the page information by referring to an information data field for each newspaper page, and stores the extracted page information in the article collection database 202 in operation 902. In this instance, the information database field for each newspaper page is pre-created by using statistics among a category and a keyword of existing article content 201 and the page information corresponding to the article content 201. The page information is extracted by searching a category table and a keyword table of the information data field for each newspaper page using the category and the keyword.

The weight assigning system 200 applies an editorial weight value based upon the editorial index to the article content 201 via the automatic weight assigning system 203. In this instance, the automatic weight assigning system 203 selects a weight value for the page reference of the article content 201 by referring to a weight value list for the page reference in operation 903, selects a weight value for the section reference of the article content 201 by referring to a weight value list for the section reference in operation 904, creates the editorial weight value based upon the editorial index by multiplying the weight value for the page reference and the weight value for the section reference, and stores the created editorial weight value based upon the editorial index in the news database 204. In this instance, the news database 204 may include a plurality of weight fields including a weight field for each media sector, an editorial weight value based upon the editorial index field, and a user weight field, in association with the article content 201. Also, the news database 204 may store the weight value for each media sector in the weight field for each media sector and the editorial weight value based upon the editorial index in the editorial weight value based upon the editorial index field.

The weight assigning system 200 may identify whether a weight error occurs in weights stored in the plurality of weight fields of the news database 201, and recreate the weight value and thereby correct the weight error when an error occurrence is identified in operation 905.

The weight assigning system 200 may retrieve a weight value from the weight field of the news database 201 in association with the article content 201. When a plurality of weight values are retrieved, the weight assigning system 200 may calculate a combined weight value based on an operation with respect to the plurality of weight values in operation 906. In this instance, the combined weight value is utilized as a reference to sort the article content in an order of the combined weight value, and the operation includes at least one of an add operation and a multiply operation for each weight value. For example, the combined weight value may be created by multiplying the weight value for each media sector and the editorial weight value based upon the editorial index.

When a search request is received from a user of the article content 201 by entering a keyword, the weight assigning system 200 acquires the article content 201 and the combined weight value from the news database 204 via the weight search engine 205, and displays the results of the search request to the user on the webpage 206 in operation 907. Also, when a weight sorting field is additionally displayed on the webpage 206, and the weight sorting field is selected, the article content 201 is sorted according to the combined weight value. Accordingly, the user may readily recognize an importance of the article content 201.

Also, a rating field may be additionally displayed on the webpage 206, so that the user may rate the article content 201. Accordingly, rating information entered into the rating field may be utilized as a user weight value. For example, the user may enter rating information of the article content 201 into the rating field using any numerical value between 1 and 10. In this instance, any numerical value between 0.1 and 1 may be utilized as the user weight value. Also, the weight assigning system 200 may store the user weight value in the user weight field of the news database 204, and utilize the stored user weight value when calculating the combined weight value in operation 906.

As described above, the user may recognize the importance of the article content 201, determined by the article generator of the article content 201, from the combined weight value. Also, since the article content 201 is sorted according to the combined weight value, the user may retrieve the article content 201 according to the importance of the article content 201.

Also, it is possible to improve the quality of the article content by making a community space between the article generator and the user based on the rating information entered into the rating field, and feeding back the rating information to the article generator.

Figure 10:
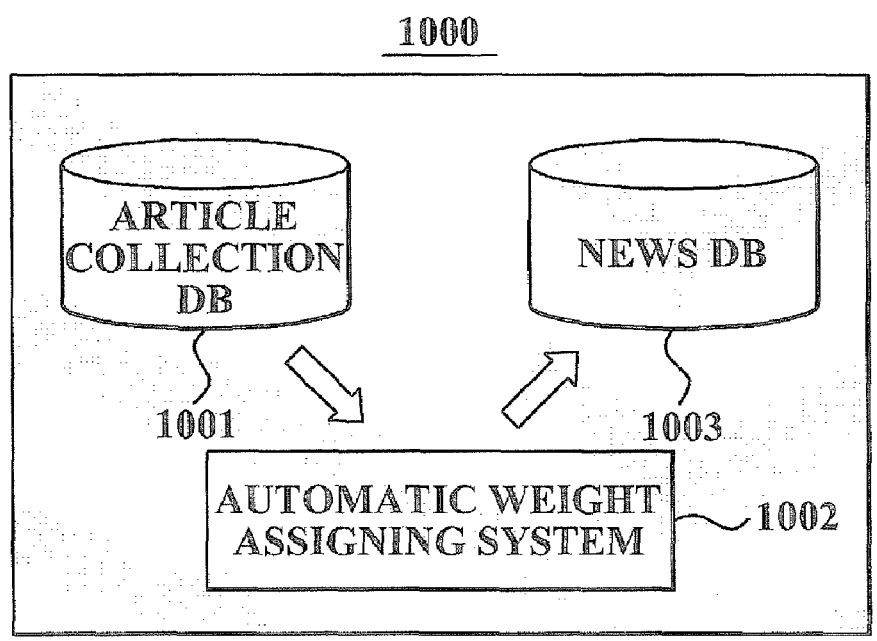
FIG. 10 is a block diagram illustrating an internal configuration of a weight assigning system according to another exemplary embodiment of the present invention.

FIG. 10 is a block diagram illustrating an internal configuration of a weight assigning system 1000 according to another exemplary embodiment of the present invention. As shown in FIG. 10, the weight assigning system 1000 may include an article collection database 1001, an automatic weight assigning system 1002, and a news database 1003.

The article collection database 1001 stores an article content received from an article providing system of an article generator.

In this instance, the weight assigning system 1000 identifies whether page information is included in the article content. When the page information is excluded from the article content, the weight assigning system 1000 extracts the page information from an information data field for each newspaper page, and includes the extracted page information in the article content.

Also, the weight assigning system 1000 may extract a weight value for each media sector of a media sector associated with the article content, from a weight value list for each media sector, and store the weight value for each media sector in the article collection database 1002 in association with the article content. In this instance, the weight value list for each media sector includes a list in which the weight value for each media sector is determined according to a total of pages of a medium for each media sector.

The automatic weight assigning system 1002 includes a plurality of weight value lists and creates an editorial weight value based upon the editorial index of the article content by referring to the plurality of weight value lists. In this instance, the plurality of weight value lists may include a weight value list for the page reference and a weight value list for the section reference. The automatic weight assigning system 1002 will be described in detail with reference to FIG. 11.

The news database 1003 stores the editorial weight value based upon the editorial index and the article content. In this instance, the news database 1003 may include a plurality of weight fields including a weight field for each media sector, an editorial weight value field, and a user weight field. The user weight field may be created by referring to rating data received from a user of the article content concerning the article content.

Figure 11:
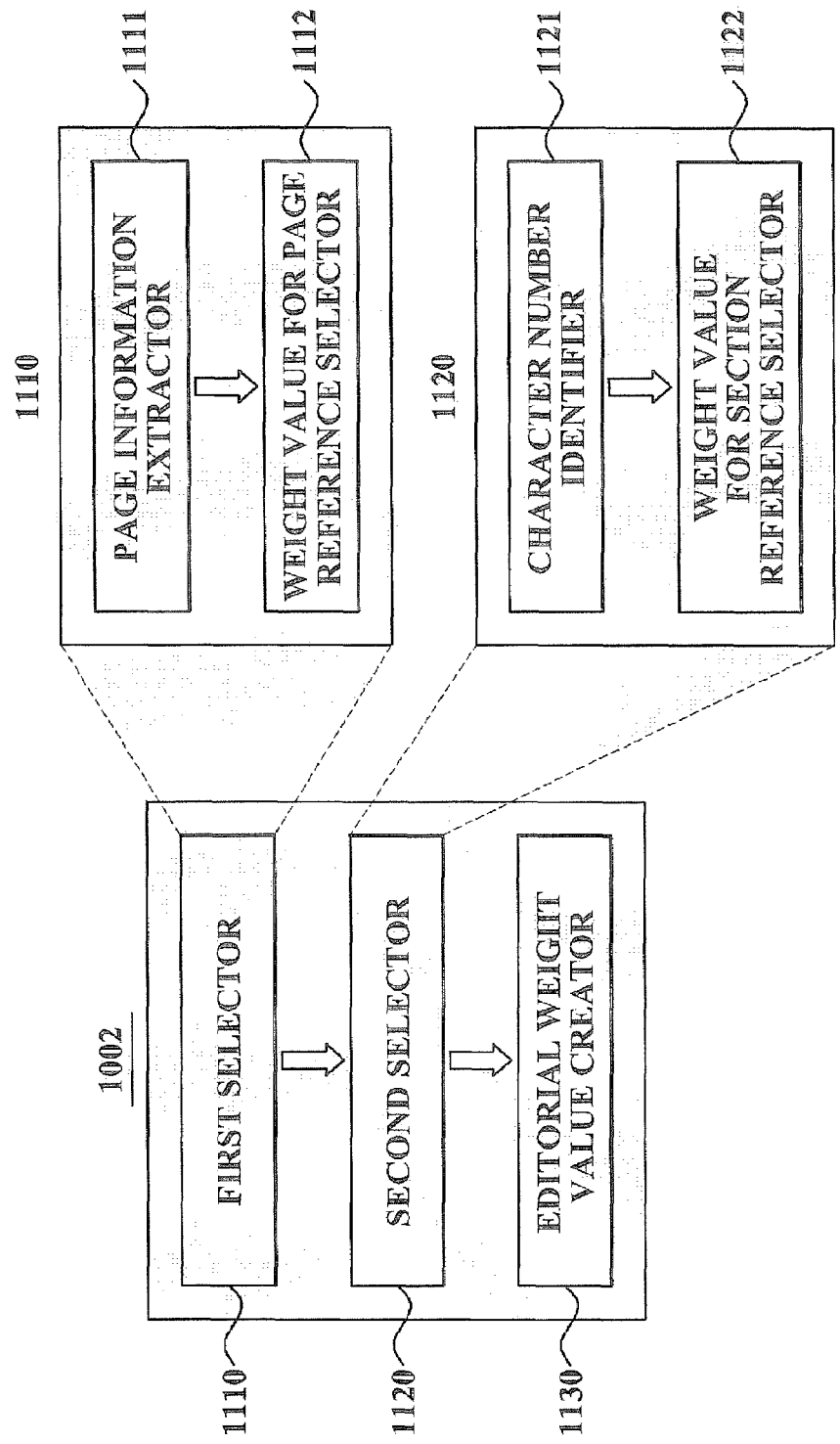
FIG. 11 is a block diagram illustrating an internal configuration of an automatic weight assigning system of FIG. 10 according to still another exemplary embodiment of the present invention.

FIG. 11 is a block diagram illustrating an internal configuration of the automatic weight assigning system 1002 of FIG. 10 according to still another exemplary embodiment of the present invention. As shown in FIG. 11, the automatic weight assigning system 1002 may include a first selector 1110, a second selector 1120, and an editorial weight value creator 1130.

The first selector 1110 selects a weight value for the page reference associated with the article content by referring to the weight value list for the page reference. In this instance, the first selector 1110 may include a page information extractor 1111 and a weight value for the page reference selector 1112. The page information extractor 1111 extracts page information of a page, including the article content, from the article collection database 1001. Also, the weight value for the page reference selector 1112 selects the weight value for the page reference, corresponding to the page information, from the weight value list for the page reference. Also, the weight value list for the page reference may include a list in which the weight value for the page reference is applied to each page of a medium including a newspaper.

The second selector 1120 selects a weight value for the section reference associated with the article content by referring to the weight value list for the section reference. In this instance, the second selector 1120 may include a character number identifier 1121 and a section weight selector 1122. The character number identifier 1121 identifies the number of characters included in the article content, and the section weight selector 1122 selects the weight value for the section reference, corresponding to the number of characters, from the weight value list for the section reference. Also, the weight value list for the section reference may include a list where in which the weight value for the section reference is applied to the article content in an order of a number of characters. In this instance, the article content is included in the same page of a medium including a newspaper.

The editorial weight value creator 1130 creates the editorial weight value based on the weight value for the page reference and the weight value for the section reference.

FIG. 12 illustrates an example of a weight value list for the page reference 1200 according to an exemplary embodiment of the present invention. As shown in FIG. 12, the weight value list for the page reference 1200 may include a page field 1201, and a weight field for each page 1202.

The page field 1201 indicates a page including a corresponding article content in a medium, such as a newspaper. Also, the weight field for each page 1202 indicates a weight value for the page reference with respect to the page.

As described above with reference to FIG. 4, it is possible to extract page information corresponding to a predetermined page of the article content, and acquire the weight value for the page reference of the page by referring to the page field 1201 of the weight value list for the page reference. In this instance, the weight value for the page reference and a weight value for the section reference, which will be described with FIG. 13, are utilized to create the editorial weight value based upon the editorial index.

FIG. 13 illustrates an example of a weight value list for the section reference 1300 according to an exemplary embodiment of the present invention. As shown in FIG. 13, the weight value list for the section reference 1300 may include a section ranking field 1301 and a weight value for the section reference field 1302.

The section ranking field 1301 determines a ranking with respect to each of a plurality of article contents, which are included in the same page, according to the number of characters of each article content, and thereby determines a weight value for the section reference in the section weight field 1302 according to the determined ranking. Specifically, the article content with the greatest number of characters in the same page ranks a first place in the corresponding page.

In this instance, it is possible to extract the weight value for the page reference and the weight value for the section reference associated with the article content by referring to the weight value list for the page reference 1200 shown in FIG. 12 and the weight value list for the section reference 1300 shown in FIG. 13, and create the editorial weight value based upon the editorial index by performing an operation with respect to the weight value for the page reference and the weight value for the section reference.

For example, an editorial weight value based upon the editorial index of an article content, which includes a greatest number of characters in a front page of newspaper, may be calculated by a scheme "weight value for the page reference (100)×weight value for the section reference (1)=100", as shown in FIGS. 12 and 13.

The weight assigning method according to the above-described exemplary embodiment of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. The media may also be a transmission medium such as optical or metallic lines, wave guides, and the like, including a carrier wave transmitting signals specifying the program instructions, data structures, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention.

According to the present invention, it is possible to assign an editorial weight value based upon the editorial index to an article content according to a weight value for the page reference and a weight value for the section reference, and provide a user of the article content with the article content and the editorial weight value based upon the editorial index, so that the user may recognize an importance of the article content, determined by an article generator of the article content, from the editorial weight value based upon the editorial index.

The weight assigning method according to the above-described exemplary embodiment of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention.

Also, according to the present invention, it is possible to improve the quality of an article content by providing a user with a rating field for the article content, making a community space between an article generator and the user based on rating information entered into the rating field, and feeding back the rating information to the article generator.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

The terminology used in the description of the invention herein is for the purpose of describing particular embodiments only and is not intended to be limiting of the invention. As used in the description of the embodiments of the invention and the appended claims, the singular forms "a", "an" and "the" are intended to include the plural forms as well, unless the context clearly indicates otherwise.

Unless otherwise defined, all technical and scientific terms used herein have the same meaning as commonly understood by one of ordinary skill in the art to which this invention belongs. All publications, patent applications, patents, and other references mentioned herein are incorporated by reference in their entirety.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that relative terms are intended to encompass different orientations of the device in addition to the orientation depicted in the Figures.

Moreover, it will be understood that although the terms first and second are used herein to describe various features, elements, regions, layers and/or sections, these features, elements, regions, layers and/or sections should not be limited by these terms. These terms are only used to distinguish one feature, element, region, layer or section from another feature, element, region, layer or section. Thus, a first feature, element, region, layer or section discussed below could be termed a second feature, element, region, layer or section, and similarly, a second without departing from the teachings of the present invention.

It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Further, as used herein the term "plurality" refers to at least two elements. Additionally, like numbers refer to like elements throughout.

Thus, there has been shown and described several embodiments of a novel invention. As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required". Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow. The scope of the disclosure is not intended to be limited to the embodiments shown herein, but is to be accorded the full scope consistent with the claims, wherein reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. Section 112, sixth paragraph, unless the element is expressly recited using the phrase "means for" or, in the case of a method claim, the element is recited using the phrase "step for."

What is claimed is:

1. A computer-implemented method of assigning a weight value to an online news article, the method comprising the steps of:
   receiving a plurality of news article contents;
   storing at least some of said received news article contents in a first database;
   assigning editorial weight values based upon editorial index from the source of the news article to at least some of said stored article contents according to at least one weight value list;
   storing the article contents with said assigned editorial weight values in a second database;
   providing an article search field to receive a keyword from a user of the article content to retrieve the article content;
   providing the article content and the editorial weight value via a weight search engine when the keyword is received;
   sorting the article content according to the editorial weight value based upon the editorial index; and
   displaying the article content to the user based on the editorial weight value.

2. The computer-implemented method of claim 1, further comprising the step of creating the editorial weight values based upon the editorial index from the source of the news article, wherein the weight value list comprises a first weight value list for page reference to the page of the source and a second weight value list for section reference to position of the news article in a specific page of the source, and
   wherein the step of creating the editorial weight values based upon the editorial index comprises the steps of:
   selecting a first weight value for the page reference associated with the article content by referring to the first weight value list;
   selecting a second weight value for the section reference associated with the article content by referring to the second weight value list; and
   creating the editorial weight value based upon the first weight value and the second weight value.

3. The computer-implemented method of claim 2, wherein the first weight value list for the page reference to the page of the source comprises a list in which the first weight value for the page reference is applied to page numbers of the source, and
   the step of selecting the first weight value for the page reference comprises the steps of:
   extracting page information of the source where the article content is included, from the article content stored in the first database; and
   selecting the first weight value for the page reference, corresponding to the page information, from the first weight value list for the page reference.

4. The computer-implemented method of claim 3, wherein the step of receiving and storing comprises the steps of:
   identifying whether the page information is included in the article content; and
   extracting the page information from a predetermined information data field for each newspaper page, and storing the extracted page information in the first database when the page information is excluded from the article content.

5. The computer-implemented method of claim 4, wherein the information data field for each newspaper page includes the page information corresponding to a category table and a keyword table, and provides the page information via a category and a keyword of the article content.

6. The computer-implemented method of claim 2, wherein the second weight value list for the section reference comprises a list in which the second weight value for the section reference is applied to the article content, and
   the step of selecting the second weight value for the section reference comprises the steps of:
   identifying the number of characters included in the article content; and
   selecting the weight value for the section reference, corresponding to the number of characters, from the second weight value list for the section reference.

7. The computer-implemented method of claim 2, wherein the step of creating the editorial weight value based upon based upon the first weight value and the second weight value comprises the step of:
   creating the editorial weight value by multiplying the first weight value for the page reference and the second weight value for the section reference.

8. The computer-implemented method of claim 1, wherein the step of creating the editorial weight value via the automatic weight assigning system further comprises the step of:
   creating a predetermined weight value for a predetermined media category when a category of the article content is included in the media category, and
   the media category comprises a category associated with any one of an editorial, an essay, an article including the article generator's subjective editing, a personnel, an obituary, a state of affairs, a current housing price, and a stock price.

9. The computer-implemented method of claim 1, wherein the step of sorting comprises the steps of:

providing a weight sorting field for sorting the article content according to the editorial weight value; and
sorting the article content according to the editorial weight value when the weight sorting field is selected.

10. The computer-implemented method of claim 1, wherein the step of providing the article content and the editorial weight value comprises the steps of:
providing a rating field for rating the article content;
creating a user weight value based on rating information entered into the rating field; and
storing the user weight value in the news database.

11. The computer-implemented method of claim 10, wherein the user weight is fed back to the article providing system of the article generator so that the article generator utilizes the user weight value as the user's utilization rating of the article content.

12. The computer-implemented method of claim 1, wherein the second database comprises a plurality of weight fields, the plurality of weight fields comprising a weight field for each media sector, an editorial weight value field, and a user weight field, in association with the article content,
and the method further comprises the steps of:
searching the second database for a weight value associated with the article content;
calculating a combined weight value based on an operation with respect to the plurality of weight values when the plurality of weight values are retrieved; and
storing the combined weight value in the weight field to store a weight value of the article content in the second database.

13. The computer-implemented method of claim 12, wherein the combined weight value is utilized as a reference to sort the article content in an order of the combined weight value, and
the operation includes at least one of an add operation and a multiply operation for each weight value.

14. The computer-implemented method of claim 1, further comprising the steps of:
extracting a weight value for each media sector of a media sector associated with the article content, from a weight value list for each media sector; and
storing the weight value for each media sector in the first collection database in association with the article content,
wherein the weight value list for each media sector comprises a list in which the weight value for each media sector is determined according to a total number of pages of a medium for each media sector.

15. One or more storage media having stored thereon a computer program that, when executed by one or more processors, causes the one or more processors to perform acts including:
receiving a plurality of news article contents;
storing at least some of said received news article contents in a first database;
assigning editorial weight values based upon editorial index from the source of the news article to at least some of said stored article contents according to at least one weight value list;
storing the article contents with said assigned editorial weight values in a second database;
providing an article search field to receive a keyword from a user of the article content to retrieve the article content;
providing the article content and the editorial weight value via a weight search engine when the keyword is received;
sorting the article content according to the editorial weight value based upon the editorial index; and
displaying the article content to the user based on the editorial weight value.

16. A system for assigning an editorial weight value to an online news article, the system comprising:
an article collection database configured to store at least one article content received from at least one source of news articles;
an automatic weight assigning system configured to include a plurality of weight value lists and to assign at least one editorial weight value based on said plurality of weight value list to said at least one article content;
a news database configured to store said at least one editorial weight value and said at least one article content;
one or more memories for storing said news database;
a weight search engine configured to provide an article content and an editorial weight value associated with said article content when a search request having a keyword is received from a user wherein said article content is associated with said keyword;
a processor for controlling said automatic weight assigning system and said weight search engine; and
a user interface configured to display said article content to the user based on said editorial weight value.

17. The system of claim 16, wherein the plurality of weight value lists comprises a first weight value list for the page reference and a weight value list for the section reference, and
the automatic weight assigning system comprises:
a first selector configured to select a first weight value for the page reference associated with the article content by referring to the first weight value list for the page reference;
a second selector configured to select a second weight value for the section reference associated with the article content by referring to the second weight value list for the section reference; and
an editorial weight value creator configured to create the editorial weight value based upon the first weight value for the page reference and the second weight value for the section reference.

18. The system of claim 17, wherein the weight value list for the page reference comprises a list in which the weight value for the page reference is applied to page number of a source, and
the first selector comprises:
a page information extractor configured to extract page information of a page, including the article content, from the article collection database; and
a first weight value selector configured to select the first weight value for the page reference, corresponding to the page information, from the first weight value list for the page reference.

19. The system of claim 17, wherein the second weight value list for the section reference comprises a list in which the second weight value for the section reference is applied to the article content in an order of a number of characters, the article content being included in the same page of a source, and
the second selector comprises:
a character number identifier configured to identify the number of characters included in the article content; and
a second weight value selector configured to select the second weight value for the section reference, corresponding to the number of characters, from the second weight value list for the section reference.

\* \* \* \* \*